(No Model.)

J. F. SMITH.
OPENER AND HANDLE FOR SHOE POLISH OR OTHER BOXES.

No. 514,285. Patented Feb. 6, 1894.

WITNESSES:
C. H. Aragle.
L. Douville.

INVENTOR
James F. Smith
BY
John A. Wiedersheim
ATTORNEY.

United States Patent Office.

JAMES F. SMITH, OF PHILADELPHIA, PENNSYLVANIA.

OPENER AND HANDLE FOR SHOE-POLISH OR OTHER BOXES.

SPECIFICATION forming part of Letters Patent No. 514,285, dated February 6, 1894.

Application filed June 6, 1893. Serial No. 476,727. (No model.)

*To all whom it may concern:*

Be it known that I, JAMES F. SMITH, a citizen of the United States, residing in the city and county of Philadelphia, State of Pennsylvania, have invented a new and useful Improvement in Openers and Handles for Shoe-Polish or other Boxes, which improvement is fully set forth in the following specification and accompanying drawings.

My invention consists of a device for opening the lid of a box, and afterward serving as a handle for the box. To this end I employ a handle which is provided with a lip adapted to engage with the lid of the box, as hereinafter described and thus raise and remove the same, the handle being afterward operative for holding and manipulating the box, and when it is not in use it may be folded on the lid or body of the box.

Figure 1:
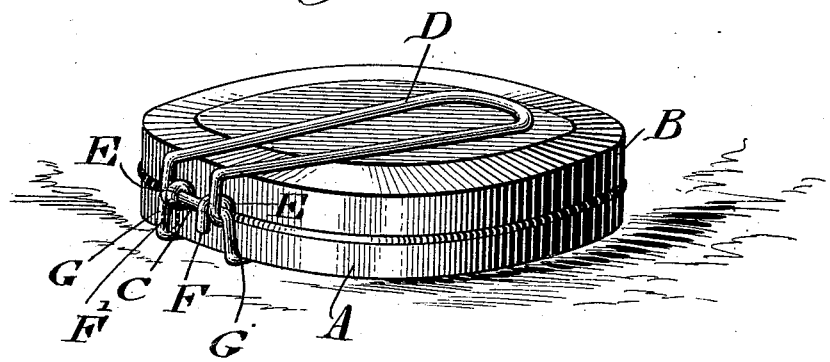
Figure 2:
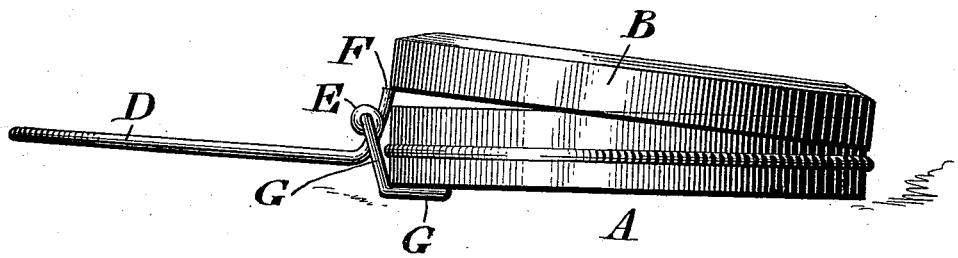

Figure 1 represents a perspective view of a box opener and handle embodying my invention, the same being shown in position on a box. Fig. 2 represents a side elevation thereof, showing the box opening operation.

Similar letters of reference indicate corresponding parts in the two figures.

Referring to the drawings: A designates the body of a shoe blacking or polish box, and B designates the lid thereof, said parts being of ordinary construction.

Connected with the side of the body A, is an ear C, on which is mounted the handle D, the latter having on a bent portion at its inner end the eyes E, which receive the cross bar or top of the ear C as the fulcrum of the handle. Projecting downwardly from the axial portion of the handle is a lip F, whose normal position is at the side of said body, while the handle is folded on the lid or top of the body, as will be seen in Fig. 1, and having its end adapted to come in contact with the upper edge of the rim of the lid when the handle is being swung into the position shown in Fig. 2.

The operation is as follows: The handle is swung upwardly and outwardly, whereby when it has made a quarter, or about a quarter turn, the lip F comes in contact with the edge or adjacent portion of the rim of the lid from below. As the handle continues its motion, the lip rises and forces the lid upwardly, thus removing the same, or releasing it sufficiently that it may be lifted clear of the box. The box may now be carried and manipulated by the handle in a convenient and reliable manner. When the handle is partly raised, the lid may be restored in position on the body, and the handle is then turned over upon the lid, whereby it is folded thereon, as shown in Fig. 1, convenient for packing, transportation, storing-away, &c.

In practice, the handle, the eyes and the lip are formed of a continuous piece of wire, and the ear C has its cross bar and the attaching legs G, also formed of a continuous piece of wire, said legs being soldered or othewise firmly connected with the body of the box, it being noticed that the lip F is continuous of one of the eyes E, and the other eye may also have a lip continuous thereof, as shown dotted at F', Fig. 1.

Having thus described my invention, what I claim as new, and desire to secure by Letters Patent, is—

1. A box having a removable lid, an ear on the body of said box, and a handle mounted on said ear adapted to fold against the lid of said box, said handle having a lip adjacent to the side of said box adapted to engage the rim of said lid, said parts being combined substantially as described.

2. A box having a removable lid, ears on the side of the body of said box, a handle having eyes mounted on said ears and a lip projecting from one of said eyes adjacent to the side of the box adapted to engage the lid and remove the same from the body when the handle is swung outwardly from the box, said parts being combined substantially as described.

3. A wire handle with an axial eye, and a projecting lip adjacent to said eye, continuous of each other, said handle being adapted to be mounted on the body of a box, and said lip to engage with the lid by the operation of the handle and open the box substantially as set forth.

JAMES F. SMITH.

Witnesses:
JOHN A. WIEDERSHEIM,
R. H. GRAESER.